(12) United States Patent
Peterson et al.

(10) Patent No.: US 6,266,143 B1
(45) Date of Patent: Jul. 24, 2001

(54) END CAP INCORPORATING LASER ALIGNMENT TARGET

(75) Inventors: David L. Peterson; Leslie P. Thompson, both of Clarks Grove; Darren M. Jahnke, Woodbury; James M. McCluskey, II, Albert Lea, all of MN (US)

(73) Assignee: Brink's Mfg. Co., Inc., Albert Lea, MN (US)

( * ) Notice: Subject to any disclaimer, the term of this patent is extended or adjusted under 35 U.S.C. 154(b) by 0 days.

(21) Appl. No.: 09/381,388

(22) PCT Filed: Mar. 20, 1997

(86) PCT No.: PCT/US97/04179

§ 371 Date: Sep. 20, 1999

§ 102(e) Date: Sep. 20, 1999

(87) PCT Pub. No.: WO98/41813

PCT Pub. Date: Sep. 24, 1998

(51) Int. Cl.[7] ................................................ G01B 11/00
(52) U.S. Cl. ............................... 356/399; 33/293
(58) Field of Search ..................... 356/399–421, 356/138, 153, 154, 148; 33/286, 290, 291, 293, 292, 296, 529, DIG. 21

(56) References Cited

U.S. PATENT DOCUMENTS 3,898,743 * 8/1975 Myeress .............................. 33/293
3,907,435 * 9/1975 Roodvoets ......................... 356/153
4,968,147 * 11/1990 Shoemaker ......................... 356/399

* cited by examiner

Primary Examiner—Frank G. Font
Assistant Examiner—Michael P. Stafira
(74) Attorney, Agent, or Firm—Larkin, Hoffman, Daly & Lindgren, Ltd.; Frederick W. Niebuhr, Esq.

(57) ABSTRACT

A laser alignment target includes a disk shaped and transparent target body with an annular inclined mounting surface, a back plate having an annular inclined retaining surface, and a torroidal alignment member retained in a generally V-shaped groove formed by the mounting and retaining surfaces. The target body has an outer rim with an annular and transverse reference surface positionable against the end edge of a pipe section to axially align the target. With the target body positioned against the pipe section, the back plate is drawn axially toward the target body, compressing the alignment member between the mounting and retaining surfaces and an inside surface of the pipe section. The compression produces radial forces that tend to radially center and secure a target. The preferred alignment member is an elastically compressible gasket that provides a fluid tight seal. Alternative alignment members include a closely wound helical coil and an inflatable torroidal casing. A further alternative alignment target mounts a glass target lens within a rigid frame through an inner gasket of thermoplastic rubber, and uses an outer gasket surrounding the frame to secure the frame within the pipe section. The target is intersected by a laser beam directed through the pipe section. Indicia on the target facilitate its alignment with the laser beam.

30 Claims, 6 Drawing Sheets

END CAP INCORPORATING LASER ALIGNMENT TARGET

BACKGROUND OF THE INVENTION

The present invention relates to pipe section alignment systems that employ a coherent energy beam and a target positioned to receive the beam, and more particularly to apparatus for releasably and integrally mounting the target to the pipe section being aligned.

The laying of strings of piping sections installing water lines or sewer lines, typically requires coaxial alignment of successive pipe sections. This involves the individual alignment of each pipe section as it is added to the pipe string. A well known and effective system for pipe section alignment includes a laser generating a coherent energy beam, positioned so that the beam is either coincident with or parallel to a longitudinal central axis of the pipe string.

As a pipe section is added to the string, its proximal end is joined to the string, and a transparent target with alignment markings is mounted near its distal end. The laser intersects the target to provide a visual indication of pipe section alignment, to provide a guide for moving the pipe primarily at its distal end to adjust the pipe section toward parallelism with the laser beam.

A variety of these systems are found in the prior art. For example, U.S. Pat. No. 4,968,147 (Shoemaker) discloses a target system including an annular base, an anchoring unit having several extended arms and a square target unit within the annular base. The base has a tapered end that can fit within the bell end of a pipe section, and an opposite flat edge that can abut the spigot end of the pipe section, in which event arms are provided for frictionally engaging the pipe interior. The annular base has holes to receive the corners of the target. Levels on opposite sides of the target facilitate angular adjustment of the base to align vertical and horizontal markings on the target.

U.S. Pat. No. 3,898,743 (Myeress) shows a resilient frame with an upper loop and two lower loops supporting a target, to enable mounting and dismounting of the target within a pipe section, by flexing the frame. The frame flexes to fit different pipe section diameters, in a manner that tends to center the target within the pipe. If desired, laser targets can be set in different positions within pipe sections using adjustable arms or legs, for example as shown in U.S. Pat. No. 4,681,439 (Shoemaker), U.S. Pat. No. 5,095,629 (Klemer et al) and U.S. Pat. No. 3,634,941 (Roodvoets et al).

While the above systems are satisfactory in many respects, they are subject to several disadvantages. Targets with adjustable legs, while accommodating several pipe section sizes, require time and skill to ensure their proper alignment. Typically they are recessed within the piping section and are not conveniently visible, requiring the operator to bend over near the open end of the pipe section to perceive the degree of alignment. Many of the targets are supported merely by gravity, subject to displacement if the pipe section is inadvertently jostled or subject to shock. Thin legs or frames such as those shown in Shoemaker and Myeress are subject to movement from such jostling or impact.

Therefore, it is an object of the present invention to provide a laser alignment target that is quickly and conveniently attached to a pipe section, yet held firmly so that it is not displaced by shock or vibration experienced by the pipe section.

Another object is to provide a means for mounting a laser alignment target as an end cap of a pipe section rather than recessed within the pipe section, to facilitate ease of visually determining pipe section alignment.

A further object is to provide an alignment structure for mounting and maintaining a target with respect to a pipe section, in a manner that continually tends to center the target within the pipe section and functions as a shock absorber between the pipe section and the target.

Yet another object is to provide, in a single device, a laser alignment target and an end cap for providing a substantially fluid tight seal at one end of a piping section.

SUMMARY OF THE INVENTION

To achieve these and other objects, there is provided an apparatus for sealing and aligning piping. The apparatus includes a fluid impermeable pipe alignment target that has a light transmissive interior section bearing pipe alignment indicia. The alignment target further has a peripheral section surrounding and substantially concentric with the interior section and defining a target mounting surface. The target is adapted for mounting in a selected position at an open end of an elongate pipe section. The apparatus further includes a compressible and fluid impermeable seal member positionable against the mounting surface over the circumferential length of the mounting surface. A retaining means secures and maintains the seal member in a compressed state between the mounting surface and a selected surface region of the elongate pipe section near the open end. The seal member forms a substantially fluid tight seal between the target and the pipe section. In the compressed state, the seal member tends to maintain the target in the selected position and further tends to radially center the target with respect to the pipe section.

Typically the pipe section is a circular cylinder, in which case the seal member is torroidal, and the target mounting surface and selected surface region are annular. The target, preferably disk-shaped, also is preferably transparent to enable an individual on the opposite side of the target from the laser source to readily ascertain where the beam impinges upon the target disk.

The retaining means can include a retaining frame that has an annular retaining surface and means for releasably securing the retaining frame adjacent the target with the retaining and mounting surfaces proximate one another. These surfaces preferably are inclined in opposite directions relative to the longitudinal axis, to provide a generally V-shaped annular channel for retaining the seal member. A rotatable handle, threaded onto a bolt that extends through the retaining frame and target, draws the retaining frame axially toward the target so that the retaining and mounting surfaces engage and compress the annular seal member, forcing it against the selected surface region of the pipe section. Retained under compression within the triangular arrangement of these surfaces, the seal member firmly secures the target with respect to the pipe section, with a holding force that is substantially uniform throughout the circumferential extension of the seal member. The preferred axial member is an elastically compressible gasket.

Several advantages arise from the uniform distribution of force. First, there are no force concentrations, such as would arise at the corners of a square target supported within an annular frame, or at the points where target-supporting legs engage the piping section. The holding force can be of substantially greater magnitude because it is spread about the entire circumference. The elastic restoring force of the seal member is applied uniformly over the target circumference, thus tending to center the target. Yet another advantage is that the seal member, when constructed of a fluid impermeable material, provides a fluid tight seal between the target and the pipe section. Thus, the target and seal member function as an end cap that seals an open end of a pipe section, preventing the entry of water or debris.

Another aspect of the present invention is a pipe alignment apparatus including a target with a light transmissive interior section bearing pipe alignment indicia, and a peripheral section surrounding the interior section and defining a target mounting surface. The peripheral section further defines a planar reference surface adapted to abut a planar edge at an open end of an elongate pipe section, to determine a longitudinal position of the target relative to the pipe section. A compressible alignment member is positionable against the mounting surface. A retaining means secures and maintains the alignment member in a compressed state between the mounting surface and a selected surface region of the elongate pipe section near the edge. The alignment member when in the compressed state tends to center the target radially with respect to the piping section and maintains the target in the selected position with the reference surface and planar edge engaged.

The reference surface, by abutting the edge of the pipe section, positively determines the target axial position and transverse orientation. The alignment member under compression radially centers the target, thus determining the target position along any pair of mutually perpendicular transverse axes. The alignment member provides a shock absorber, and avoids force concentrations to enable an overall holding force of greater magnitude.

If preferred, the alignment member can be constructed of fluid impermeable material, resulting in a substantially fluid tight seal when the target is mounted to the pipe section. A bubble gauge or other indicator can be mounted on the target, to ensure that the alignment indicia are properly aligned with respect to vertical and horizontal axes.

Thus in accordance with the present invention, a laser alignment target is quickly and conveniently installed at the end of a pipe section and held firmly in place by a force that is substantially uniform about the entire target circumference. The target is held firmly, yet at least partially isolated from shock and vibration occurring within the pipe section. Any displacement of the target from its centered position due to shock or vibration is temporary, because of the continual centering tendency of the alignment member.

IN THE DRAWINGS

For a further understanding of the above features and advantages, reference is made to the following detailed description and to the drawings in which.

DETAILED DESCRIPTION OF THE PREFERRED EMBODIMENT

Figure 1:
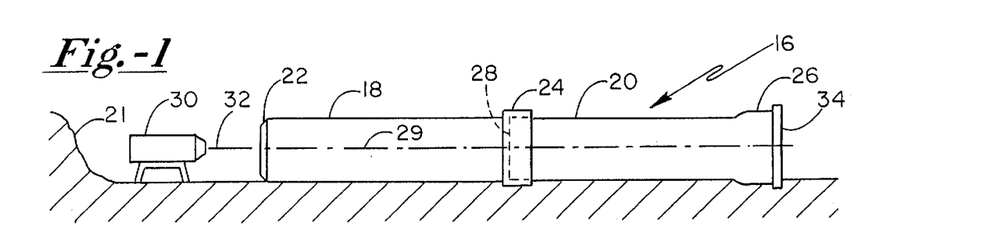
FIG. 1 is a diagrammatic view of a laser alignment system including target assembly constructed in accordance with the present invention.

Turning now to the drawings, there is shown in FIG. 1 a pipe string 16 including two elongate pipe sections shown at 18 and 20 in a trench 21. While only two pipe sections are shown, it is to be recognized that pipe string 16 when complete includes multiple coaxial pipe sections.

Pipe sections 18 and 20 are formed of polyvinyl chloride (PVC) and are substantially identical in shape. Pipe section 18 includes a spigot end 22 and a larger diameter bell end 24. Pipe section 20 likewise has a bell end 26 and a spigot end 28 inserted into bell end 24 and thus shown in broken lines.

A proper alignment of the pipe sections in string 16 is critical. Typically the intention is to form a straight line piping string, in which all of the piping sections are coaxial, i.e. centered on a longitudinal axis 29. One particularly effective approach is to generate a beam of monochromatic energy, e.g. laser energy, as a visible longitudinal axis. A laser generator 30, supported in trench 21 near spigot end 22 of pipe section 18, generates a laser energy beam 32 that propagates longitudinally along and within pipe sections 18 and 20, and pipe sections subsequently added to the string.

Pipe section 18 is aligned first. Then, each subsequent pipe section is aligned as it is added to the string. When pipe section 18 has been aligned, laser generator 30 can be mounted within that pipe section if desired. Laser beam 32 can be radially centered within the pipe sections, but need not be. If the beam is not centered, its radial offset from center must be consistent along all of the pipe sections.

A transparent or otherwise light transmissive target is removably mounted to each pipe section and used to align that pipe section with respect to the laser beam. In connection with FIG. 1 it is assumed that pipe section 18 is already aligned, and that pipe section 20 requires alignment. Accordingly, a target assembly 34 is mounted to bell end 26. The point at which laser beam 32 impinges upon the target, visually indicates the degree of alignment. Based on this indication, the operator adjusts the pipe section orientation toward alignment, specifically by moving bell end 26 with spigot end 28 installed (but not rigidly) into preceding pipe section 18. This may involve addition or removal of gravel or other material beneath and supporting pipe section 20. Once pipe section 20 is aligned, such base material is packed around it to maintain the alignment, whereupon the next pipe section in the series (not shown) can be similarly aligned.

Figure 2:
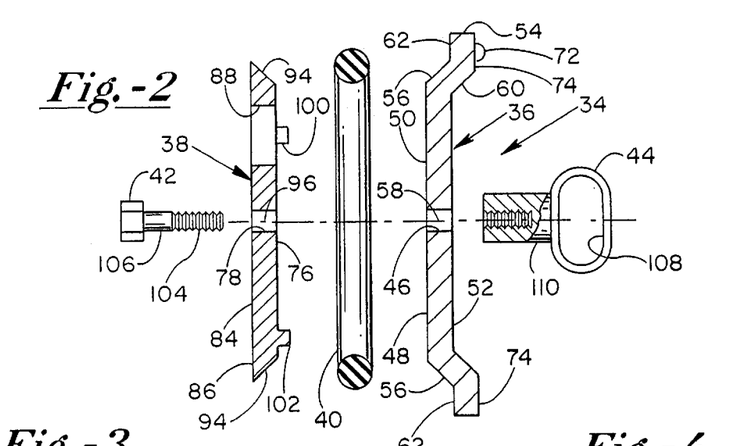
FIG. 2 is an exploded parts side elevation of the target assembly.

Target assembly 34 includes a target 36, a retaining frame-or back plate 38, an annular seal gasket 40, an externally threaded bolt 42 and an internally threaded handle 44. Target 36 (FIG. 3) is transparent and disk shaped and can be formed from a polycarbonate sheet. An opening 46 is formed through the target at its center to accommodate bolt 42. Surrounding and adjacent the opening is an interior section 48, circular in profile and having planar inside and outside surfaces indicated at 50 and 52, respectively. The target further includes an annular peripheral section or rim 54, surrounding and adjacent the interior section. Preferably, interior section 48 and peripheral rim 54 are formed as part of a single target body and thus are integral with one another. At a radially inward portion of the peripheral rim adjacent inside surface 50, the target is beveled to provide a frusto-conical mounting surface 56. The mounting surface is inclined at an angle of about 45 degrees with respect to an axis 58 of the target. The peripheral rim also is beveled adjacent outside surface 52 as indicated at 60, maintaining a target depth for structural rigidity. The radially outward portion of peripheral rim 54 includes an annular and planar reference surface 62. The reference surface is transverse, i.e. parallel to the inside and outside surfaces.

Target indicia or markings are formed on the interior section of the target, more particularly on outside surface 52. The indicia include a vertical line 64 and several circles 66, 68 and 70, all centered on target axis 58. Preferably the indicia are scored to form indentations as seen in FIG. 2. Alternatively the indicia may be printed or stamped onto the target face.

Figure 3:
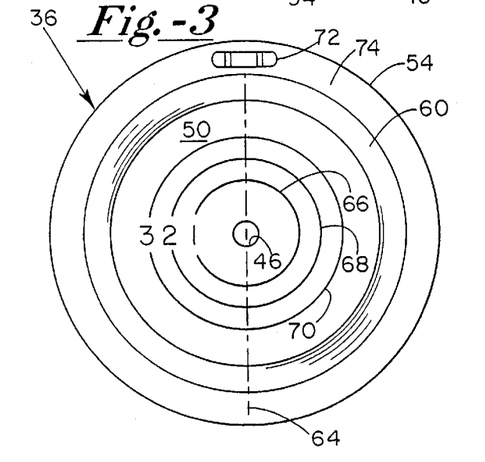
FIG. 3 is a front elevation of a target disk of the target assembly.

A bubble gauge 72 is mounted to peripheral rim 54, to an annular surface 74 opposite reference surface 62. Gauge 72 is used to ensure correct angular mounting of the target assembly, so that line 64 extends vertically. Thus, target 36 can be moved horizontally until line 64 intersects laser beam 32, for at least partial alignment. Secondly, line 64 when truly vertical cooperates with circles 66–70 to provide reference points radially offset from the target center, e.g. the intersections of line 64 and the circles. Any one of these reference points can be used for laser alignment in lieu of the target center. of course, the same reference point, e.g. the intersection of line 64 and circle 70, must be used to align all of the pipe sections. The result of this radial offset is that laser beam 32 and the pipe sections are parallel, although not concentric.

Figure 4:
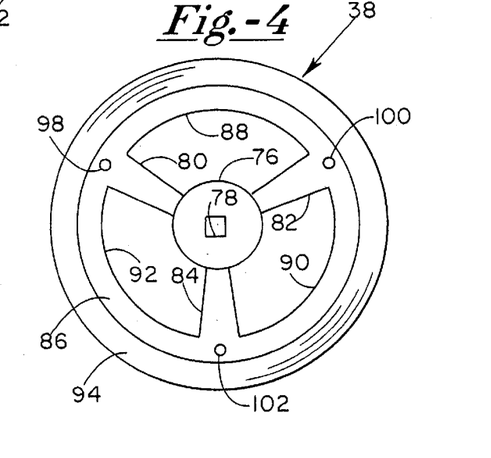
FIG. 4 is a front elevation of a back frame of the target assembly.

As seen in FIG. 4, back plate 38 is disk shaped and, like the target, formed of polycarbonate. The back plate has a center section 76 with an opening 78 formed through the section to accommodate bolt 42. Opening 78 has a square profile. Three support arms 80, 82 and 84 project radially outward from center section 76 and support an annular outer rim 86, so that the rim, support arms and center section are integral. Arms 80–84 also define three arcuate cut-outs through the back plate, as shown at 88, 90 and 92. When the target assembly is mounted to a pipe section, one of these cut-outs is aligned with the intended point of laser impingement on the target. Thus the back plate may be opaque if desired.

The outer rim of back plate 38 is beveled to provide a frusto-conical retaining surface 94, inclined at an angle of 45 degrees with respect to an axis 96 of the back plate. The retaining surface cooperates with mounting surface 56 of the target, in a manner later explained, to mount and align the target relative to the pipe section. Four spacers, three of which are shown at 98, 100 and 102, extend axially from the back plate in the axially outward direction toward target 36.

Figure 5:
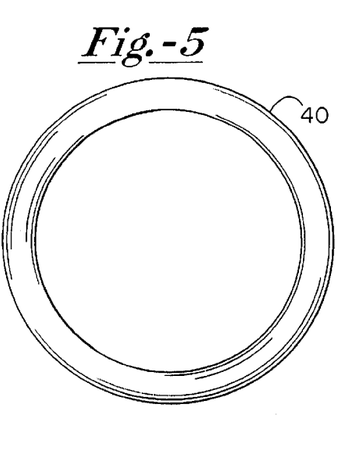
FIG. 5 is a reduced front elevation of an annular seal gask of the target assembly.

Seal gasket 40 (FIG. 5) is torroidal and preferably is constructed of isoprene cord. The seal gasket is elastically compressible and uniform in size, shape and composition throughout its circumference. Accordingly, the seal gasket produces a uniform elastic restoring force when compressed between annular surfaces.

Returning to FIG. 2, bolt 42 includes an elongate externally threaded shank 104 and a head 106 having a square profile corresponding to opening 78 through back plate 38. Handle 44 includes a loop 108 for rotating the handle and an internally threaded elongate shaft 110.

With bolt 42 extending through back plate 38 and target 36 and threadedly engaged in shank 104, handle 44 is rotatable to draw the back plate toward and eventually against the target. When handle 44 is tightened to draw the back plate toward the target, spacers 98–102 engage the target to prevent further tightening. These spacers, when provided with reference to a particular size of seal gasket and pipe section diameter, are sized to engage the target coincident with a predetermined desired compression of the gasket. The handle also is rotatable in the opposite direction, to permit disengagement and withdrawal of the back plate from the target.

To effectively align successive pipe sections, target 36 must be releasably fixed to the pipe sections individually but in a predetermined alignment, preferably a radial centering in which target axis 58 and the pipe string longitudinal axis 29 coincide. Further, the target assembly should lend itself to a rapid and convenient mounting of the target that does not require undue skill on the part of the operator. Dismounting of the target after alignment should likewise be quick and convenient.

Figure 6:
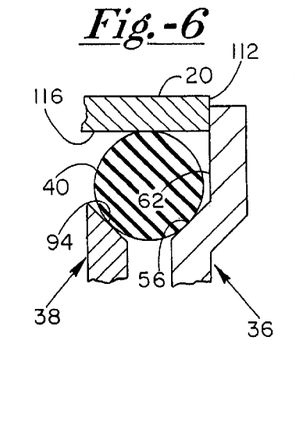
FIGS. 6 and 7 are enlarged diagrammatic views of part of the target assembly and a pipe section illustrating initial placement and complete installation, respectively.
Figure 7:
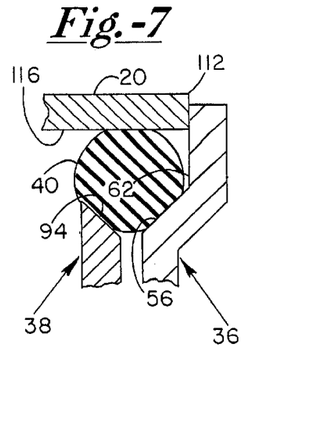

The manner in which the present target assembly meets the objectives is perhaps best understood in connection with FIGS. 6 and 7 showing an upper portion of the target assembly and a portion of pipe section 20.

Mounting involves an initial positioning of the target assembly at bell end 26 (FIG. 6). Specifically, reference surface 62 abuts a planar and transverse end edge 112 of pipe section 20. This positions the reference surface in a transverse plane to transversely align the target, although the target is not necessarily radially centered with respect to the pipe section. Target 36 and back plate 38 are concentric and axially spaced apart from one another. Seal gasket 40 is in a relaxed or unstressed state, captured between the target peripheral rim 54 and back plate in an annular, V-shaped groove formed by mounting surface 56 and retaining surface 94. The most radially outward edge 114 of seal gasket 40 is proximate an inside surface 116 of pipe section 20. The seal gasket may be contiguous with surface 116, although there is not any substantial gasket compression at this stage.

It is to be appreciated that a similar sectional view showing the bottom of the target assembly, or any section of the target assembly along the periphery, would show a similar axial separation of the target and back plate and a similar positioning of the seal gasket.

Figure 8:
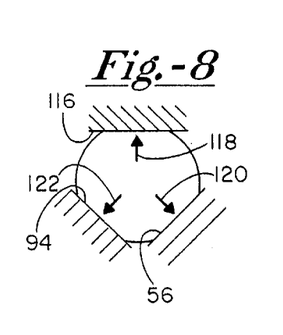
FIG. 8 is a diagrammatic view showing elastic restoring forces in the installed seal gasket.

With the target assembly positioned as shown in FIG. 6, the operator rotates handle 44 to draw bolt 42 axially into shaft 110, which draws back plate 38 closer to the target. As inclined surfaces 56 and 94 are brought closer together, seal gasket 40 is forced radially outward, i.e. upward as viewed in FIG. 6, toward and against inside surface 116. In response to further tightening of handle 44, seal gasket 40 undergoes elastic compression between mounting surface 56, retaining surface 94 and pipe section inside surface 116, as is shown in FIG. 8. Arrows at 118, 120 and 122 show the directions of the elastic restoring forces corresponding to these surfaces. The restoring force against inside surface 116 acts radially outwardly of the target. The restoring forces against surfaces 56 and 94 balance one another in the axial direction, but provide a resultant radially inward component. Thus, the elastic restoring force urges the target and backing plate radially inward from pipe section 20. When target 36 is radially centered with the pipe section, the radial distance from inclined surfaces 56 and 94 to inside surface 116 is the same over the circumference of the target and back plate. The degree of gasket compression is uniform. The resultant elastic restoring forces are uniform as well, balancing one another to maintain the target in its radially centered position.

If target 36 is off center, a resulting imbalance in the elastic restoring forces tends to return the target to its centered position. Thus, because of seal gasket 40, the target assembly is self-centering. There is no need for an operator to precisely align the target prior to securing it with the handle.

As handle 44 is tightened further, target 36 and back plate 38 continue to force the seal gasket radially outward. This continually increases the extent to which the gasket is compressed between surfaces 56, 94 and 116, and thus continually increases the elastic restoring force of the gasket acting against each of these surfaces. The tendency to radially center the target likewise increases. When handle 44 is fully tightened, seal gasket 40 firmly and securely holds target 36 to the bell end of pipe section 20, due to its frictional surface engagement against surfaces 56, 94 and 112 augmented by the elastic restoring force. This condition is shown in FIG. 7.

While centering and firmly securing the target, seal gasket 40 provides the additional benefit of a fluid tight seal at bell end 26. The seal gasket, pipe section 20, target 36 and back plate 38 are formed of water impermeable materials. With the target assembly secured, seal gasket 40 is contiguous with the pipe section, the target and the back plate over its entire circumferential length and over a width (non-circumferential dimension, either axial or inclined) of at least one-half inch. Accordingly, target assembly 34 provides an effective closure at the end of pipe section 20, tending to prevent water, dirt, gravel and other foreign matter from entering the pipe string.

With the target assembly mounted as described, the operator views the target to determine the point of impingement, i.e. the intersection of laser beam 30 with target 36. If the point of impingement coincides with the selected location on target 36, e.g. the intersection of line 64 and circle 70, pipe section 20 is properly aligned and the operator can pack gravel and other material around the pipe to more firmly secure its position. Otherwise, the pipe section is shifted and material is displaced or added as necessary, to achieve alignment.

After pipe section 20 is aligned and secured, the target assembly is conveniently released from the pipe section, by rotating handle 44 to loosen the target and back plate coupling, which allows radial contraction of seal gasket 40 to free the assembly.

Figure 9:
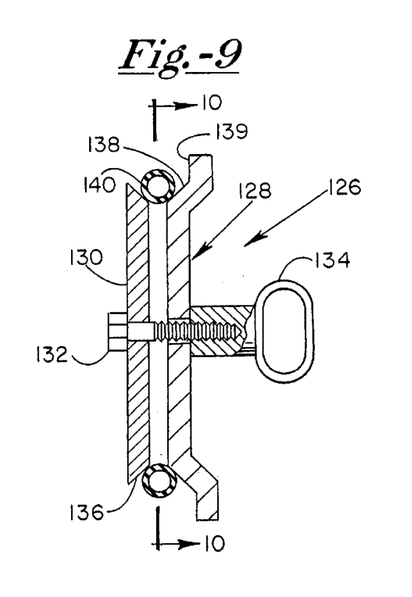
FIG. 9 is a side sectional view of an alternative target assembly constructed in accordance with the present invention.
Figure 10:
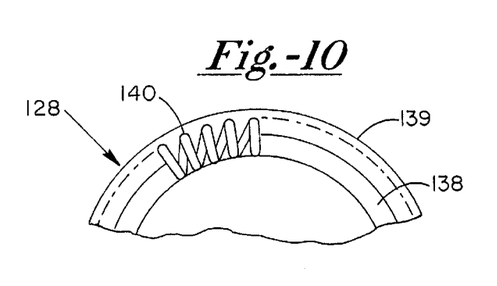
FIG. 10 is a sectional view of the alternative target assembly taken along the line 10—10 in FIG. 9.

FIGS. 9 and 10 illustrate an alternative target assembly 126 including a target 128, a back plate 130, a bolt 132 and internally threaded handle 134 rotatable to draw the back plate axially toward the target. Target 128 includes a peripheral rim with an annular inclined mounting surface 138 and a transverse and annular reference surface 139. The back plate has an outer rim with an annular inclined retaining surface 136.

As best seen in FIG. 10, target assembly 126 utilizes a helically wound coil 140 in lieu of a seal gasket. Coil 140 is constructed of any suitable material for providing resiliency and need not be water impermeable. Coil 140 is closely wound, and when mounted to a pipe section, tends to prevent foreign matter from entering the pipe section. At the same time, because coil 140 does not form a fluid tight seal, target assembly 126 is well suited for providing pressure relief in a pipe string subject to pressure. Coil 140 centers and secures the target by its elastic restoring force, much in the same manner as gasket 40.

Figure 11:
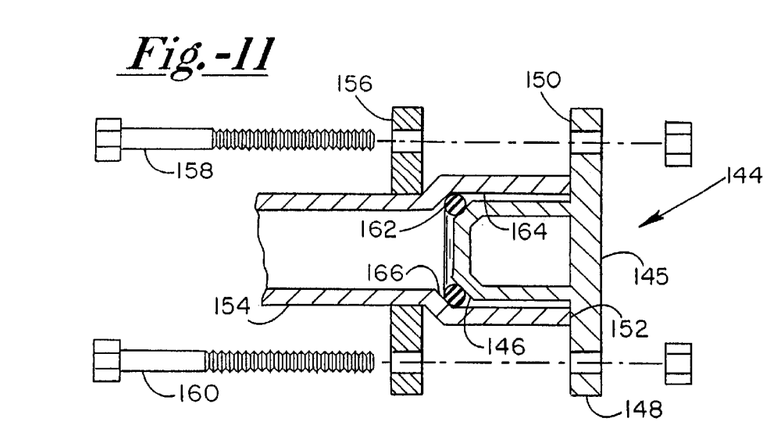
FIG. 11 is a side sectional view of another alternative target assembly.

FIG. 11 shows a further alternative target assembly 144 with a target body 145 formed to resemble a spigot end of a pipe section to provide an annular mounting surface 146. At the opposite end of target body 145 is a rim 148 with a reference surface 150 positionable against an end edge 152 of a pipe section 154. The target assembly also includes a collar 156 mounted to pipe section 154 just inwardly of the bell end. A plurality of bolts, two of which are shown at 158 and 160, are distributed angularly about the target assembly circumference. The bolts extend axially through collar 156 and rim 148 and can be tightened to draw target body 145 axially inward, or to the left as viewed in the figure.

A seal gasket 162 surrounds the target body and is positioned between mounting surface 146 and longitudinal and transverse inside surfaces 164 and 166 of the pipe section. As the target body is drawn axially inward, seal gasket 162 is elastically compressed and provides the elastic restoring forces tending to center target body 145 radially within the pipe section. The assembly includes a transparent, disk shaped target region axially aligned with and radially inward of reference surface 150. As an alternative for more convenient reading of the target during pipe section alignment, the target can be axially aligned with rim 148, with an open or transparent framework provided at the axially inward end.

While target assembly 144 provides structure for radially centering and transversely aligning the target without requiring a back plate, target assembly 34 is more conveniently connected and disconnected.

Figure 12:
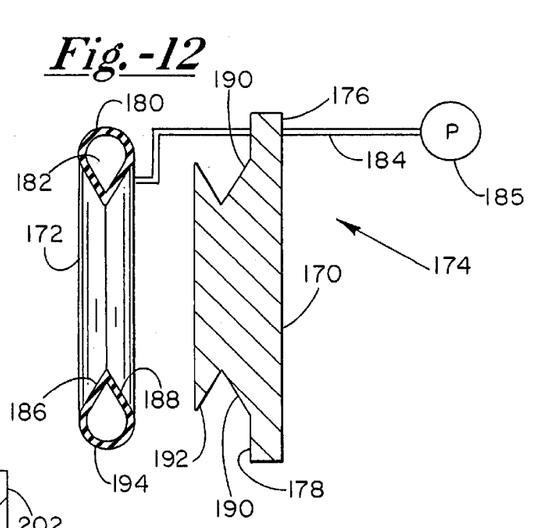
FIG. 12 is a side sectional view of a further alternative target assembly.

FIG. 12 illustrates a target body 170 and a pneumatic seal gasket 172 of a further alternative target assembly 174. The target body includes a rim 176 with an annular reference surface 178 adapted to engage the end edge of a pipe section, for initial positioning and transverse alignment in the manner previously described. Pneumatic seal gasket 172 is torroidal and preferably constructed of a fluid impermeable polymer, which may be an extensible or inextensible polymer. The polymer forms a casing or wall 180 that encloses a chamber 182. A pneumatic line 184 is open to the chamber and used to supply a fluid (preferably air) under pressure from a source 185 to the chamber, to inflate the gasket casing.

As shown by the sectioned portions of gasket 172, wall 180 is shaped to provide non-circular profiles taken in centered, axially extended planes. The profiles include two substantially linear portions 186 and 188 confronting a mounting surface 190 and a retaining surface 192 of the target body, along with a radially outward arcuate segment 194. This profile increases the tendency of pneumatic gasket 172 to remain seated in surrounding relation to target body 170 when not fully inflated.

Target assembly 174 is installed initially with pneumatic gasket 172 not fully inflated, which facilitates the axially inward movement necessary for bringing reference surface 178 into engagement with the end edge of a pipe section. With target body 170 thus positioned, air is provided under pressure to the pneumatic gasket. As the gasket is inflated, arcuate segment 194 engages the inside surface of the pipe section, over the entire circumference of the gasket. Continued inflation deforms or compresses gasket 172, in the sense of reducing the curvature of segment 194 where it is contiguous with the pipe section.

The force due to air pressure within the gasket acts in all directions. Axial force components act against mounting surface 190 and retaining surface 192 and thus are balanced. Radial force components act radially outward against the pipe section, and radially inward against surfaces 190 and 192, thus tending to radially center the target body and to securely maintain the target body in place upon full inflation. Thus as compared to seal gasket 40, the results are the same, although pressure is employed in lieu of an elastic restoring force. Target assembly 174 has an advantage in requiring fewer parts. A possible disadvantage is the need for a pressurized air source.

Figure 13:
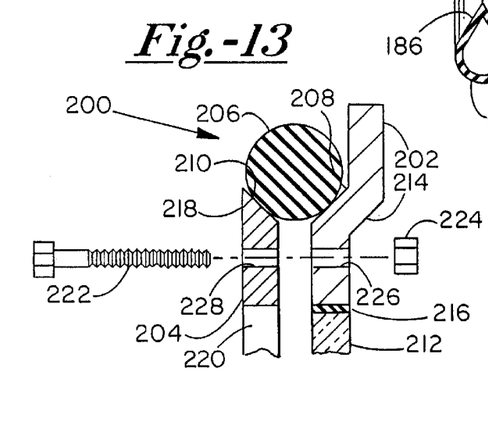
FIG. 13 illustrates a further alternative embodiment with a glass target interior.

FIG. 13 illustrates another embodiment target assembly 200 including a target 202, a retaining frame 204, and a torroidal seal gasket 206. The seal gasket is disposed between the target and retaining frame, contiguous with inclined annular surfaces 208 and 210 of the target and retaining frame, respectively.

Target 202 has a disk shaped interior section 212 formed of glass and a peripheral section 214 formed of polycarbonate, PVC or other suitable material that is capable of bearing tensile and compressive stress, but need not be transparent. An annular seal layer 216 is disposed between the interior and peripheral sections. The seal layer is formed of a resilient, water impermeable material, to form a fluid tight seal between sections 212 and 214, to absorb compressive forces of the peripheral section so that the glass interior section is not directly subject to these forces. Seal layer 216 also absorbs shock and vibration, while tending to center the interior section within the peripheral section.

Retaining frame 204 is substantially similar to retaining frame 38, with a center section and several support arms that extend radially outward to a rim 218. The support arms define several cut-outs, one of which is shown at 220. As before, frame 204 can be positioned so that the laser beam is directed through one of the cut-outs. Seal gasket 206 can be substantially identical to seal gasket 40.

An annular arrangement of fasteners, each including a bolt 222 and internally threaded fastener 224, is used to draw target 202 and retaining frame 204 axially toward one another. This expands seal gasket 206 radially outward against the interior surface of a PVC pipe section (not shown). The target and retaining frame have respective openings 226 and 228 to accommodate bolt 222.

The primary advantage of target assembly 200 as compared to the other target assemblies, is the enhanced transparency of interior section 212. Also, the transparency better survives long term use, because the glass is more resistant to scratching from contact with grains of sand, small stones and other debris. However, the use of glass to form the interior section requires protection against tensile and compressive stress, thus the need for rim 214 and seal layer 216. Other materials such as polycarbonate are better suited for one piece target construction.

Figure 14:
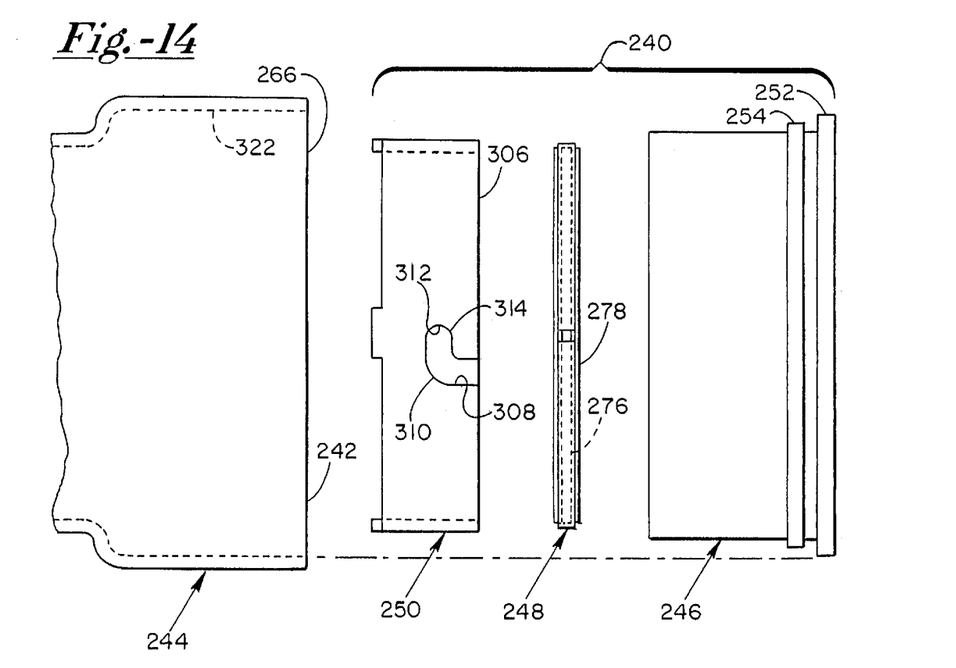
FIG. 14 is a side elevation of another alternative embodiment target assembly, with a removable glass target lens.

FIG. 14 shows, in partially exploded parts fashion, a target assembly 240, insertable into a bell end 242 of a pipe section 244. When installed, the target assembly facilitates laser alignment and provides a fluid seal. Major components of the target assembly include an annular frame or outer ring 246, a target 248, and a clamping sleeve 250 insertable into frame 246 along with the target, for releasably retaining the target inside of the frame. Near its outer end 252, i.e. the right end as viewed in FIG. 14, frame 246 is surrounded by an outer seal gasket 254.

Figure 15:
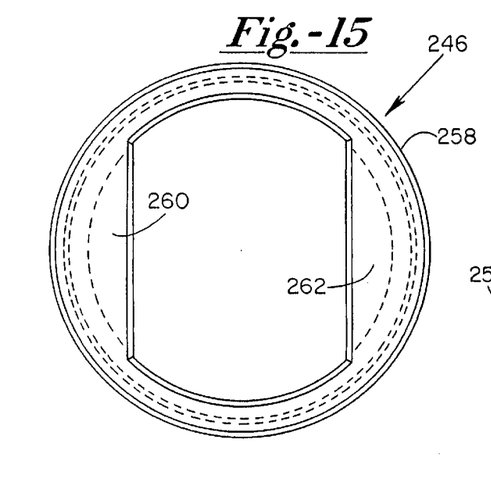
FIG. 15 is an end elevation of an annular frame of the target assembly in FIG. 14.
Figure 16:
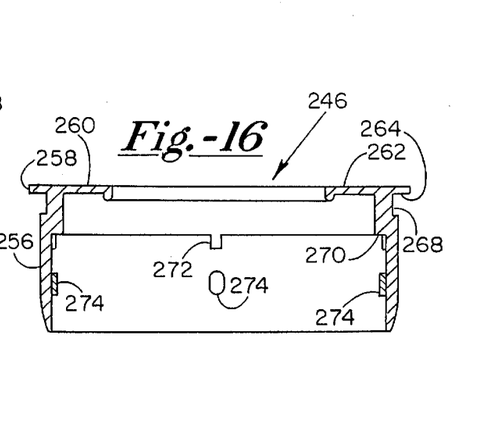
FIG. 16 is a sectional view of the frame, taken along the line 16—16 in FIG. 15.

FIGS. 15 and 16 show annular frame 246 in greater detail. Essentially, the frame includes an annular body 256 and a planar rim 258 integral with the sleeve. Rim 258 is formed with two opposed handle portions 260 and 262 to facilitate mounting and dismounting of the target assembly. Rim 258 provides a reference surface 264 that abuts an outer edge 266 of the pipe section to set the longitudinal or axial position of the fully inserted target assembly. An annular groove 268, adjacent rim 258 accommodates outer seal gasket 254. Several mounting and fastening features are formed into the frame interior, including an annular shoulder 270; four longitudinally disposed, angularly spaced apart ribs 272 adjacent the shoulder; and four angularly spaced apart lugs 274. Frame 246 is substantially rigid, preferably formed of structural foam polypropylene. The frame can be formed by molding or other processes that lend themselves to one-piece construction.

Figures 17, 18, 19, 20:
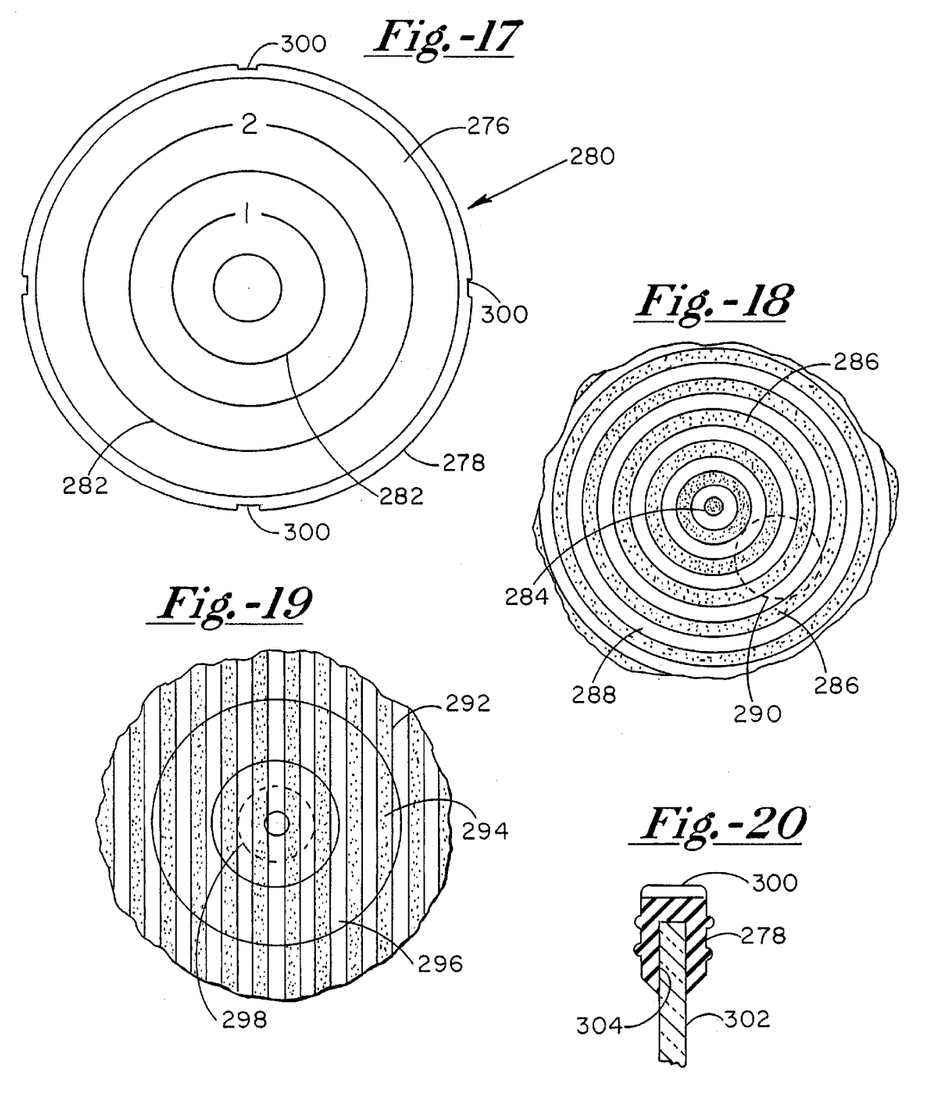
FIG. 17 is an end elevation of the target lens and a seal gasket surrounding the lens.
FIG. 18 is an enlarged partial view of the lens.
FIG. 19 is a partial view of an alternative target lens.
FIG. 20 is an enlarged cross-sectional view, taken along the line 20—20 in FIG. 17.

As seen in FIG. 17, target 248 includes a light transmissive, disk shaped target lens 276 surrounded by a lens gasket 278 that functions as an inner seal gasket between the lens and annular frame 246. Lens 276 is formed of tempered glass, and thus is highly resistant to scratching. Indicia, printed on an outer surface 280 of target lens 276, include a series of circles 282 concentric about the target center. Two of the circles are numbered.

Target assembly 240 can incorporate several further features to enhance its utility. The first of these is a plurality of apertures formed through target lens 276. The apertures provide ventilation to enhance air exchange in the vicinity of the bell end of pipe section 244 when the target assembly is inserted into the bell end. Regardless of whether such apertures are present, lens gasket 278 and outer seal gasket 254 provide fluid tight seals that tend to keep dirt, gravel and other foreign matter out of the pipe section interior.

A second feature involves mounting target 248 at a slight incline; more particularly, such that outer surface 280 and a parallel and opposite inner surface of the target lens are not perpendicular to the pipe section axis when the target assembly is fully inserted. Consequently, when the pipe section and laser beam are aligned, i.e. parallel, the target lens surfaces likewise are not perpendicular to the beam. As a result, any portion of the beam reflected by lens 276 is prevented from propagating back in the axial direction against the incident beam, which would adversely affect the performance of certain types of lasers. A slight incline, e.g. 3–10 degrees, is sufficient to avoid the problem, and further is preferred since it minimizes any distortion of the beam.

In FIG. 18, a central portion of lens 276 is enlarged to reveal further features; namely, a center area 284 and a series of annular light scattering bands 286 radially spaced apart from one another and concentric about the center area. Bands 286 have a uniform width in the radial direction of about 1/16 of an inch. Annular transparent bands 288, between adjacent scattering bands, likewise have a radial dimension of about 1/16 of an inch.

Center area 284 and bands 286 transmit light, but are translucent rather than transparent and appear grey in color. This appearance is due to a controlled, uniform texturing of lens surface 280, over a selected "light scattering" region that encompasses the center area and the scattering bands. More particularly target lens 276, with surface 280 masked to leave the intended light scattering region exposed, is sand blasted, i.e. subjected to a high speed stream of aluminum oxide ($Al_2O_3$) particles in the range of about 50–80 microns. In a preferred approach, the sandblasting is accomplished by moving the target lens past a nozzle oscillated to provide full surface coverage of the moving lens. Air pressure at 80 psi is used to project the aluminum oxide particles out of the nozzle and onto the lens surface at high speed. The masked region, i.e. the annular bands 288 between adjacent bands 286, remains smooth and transparent.

The sandblasting technique has been found especially effective in producing well defined light scattering regions. Other less preferred abrading techniques can be employed, e.g. abrasive pads, slurries or texture paints or coatings.

Regardless of the approach, an important feature of the surface roughening is that the textured or light scattering areas, while randomly scattering a substantial proportion of the laser energy impinging upon them, also transmit a substantial portion of that energy. More specifically, it has been found that the light scattering areas should transmit at least about 20 percent of the laser energy that impinges upon them, more preferably at least about 30 percent. The remainder of the impinging energy is off-axis, i.e. scattered in directions other than that of the beam axis, with the exception of minute amounts subject to absorption and reflection.

Consistent with the primary concern for a balance between the proportions of the laser energy transmitted and scattered, different grit sizes and abrasive approaches can be used. Chemical etching, while perhaps useful in limited circumstances, has been found less satisfactory, because chemically etched surfaces tend to transmit less than the desired minimum percentage of the impinging energy.

The primary benefit of selectively roughening target surface 280 is that it facilitates visual recognition of the impingement area, i.e. the area over which the laser beam intersects lens 276. The broken lines in FIG. 18 depict a circular impingement area 290. Due to the scattering of the laser energy by bands 286, impingement area 290 appears as a spot on surface 280, perceived visually from vantage points remote from the beam axis. Consequently, a worker or inspector can check the alignment of a pipe section while standing on ground above a ditch where pipe sections are being installed (for example), rather than being required to climb into the ditch for closer proximity and better alignment with the beam axis. Thus, checking the alignment of pipe sections is safer, more convenient, and requires less time.

In spite of the advantages of light scattering, target lens 276 preferably transmits most of the laser energy in the axial direction. This is because of the desire to inspect and confirm pipe section alignment by projecting an image of the target including the impingement area onto a surface spaced apart longitudinally from the pipe section. The utility of this approach depends on a bright, well defined image, particularly on sunny days. Accordingly there is a need to balance the proportions of laser energy transmitted axially and scattered, respectively.

Primarily there are two factors that facilitate the desired balancing of light transmission and scattering. The first is the transmissivity of the scattering region (i.e. center area 284 and bands 286), as discussed above. The second factor is the full scattering arrangement or pattern, i.e. the sizes, shapes and locations of the light scattering areas and adjacent transparent areas.

With reference to FIG. 18, the scattering pattern or arrangement can be comprised of concentric bands or rings, alternately scattering and transparent. The size of the bands, in this case their radial dimensions, are selected with reference to the expected size of impingement area 290, to ensure that the impingement area encompasses at least two different scattering areas, e.g. two or more bands 286. A larger number of encompassed scattering areas and encompassed transparent areas is advantageous, because the balance between scattering areas and transparent areas remains more stable. Impingement area 290 is occupied by scattering areas and transparent areas in about the same proportion, given that bands 286 and bands 288 have the same radial dimension. Assuming an equal distribution, and further assuming that the transparent areas transmit all of the laser energy axially while the scattered areas similarly transmit 40 percent, then about 70 percent of the energy through impingement region 290 is transmitted axially, while the remaining 30 percent is scattered off-axis.

The factors can be altered to achieve the same overall result. For example, a scattering pattern in which the scattering areas transmit 50 percent of the laser energy, and occupy 60 percent of the impingement area, also would lead to an average axial energy transmission of 70 percent. on the other hand, scattered areas that axially transmit only 25 percent of the laser energy result in 70 percent average transmission if they constitute only 40 percent of the impingement area while the remaining 60 percent is transparent.

Thus, the pattern of alternating transparent and scattering areas lends flexibility. A further benefit is a better defined image of the impingement area, since the transparent areas, unlike the light scattering areas, transmit the image substantially without distortion. A further benefit of the concentric ring or band pattern is that it complements and lends more detail to the printed target pattern of concentric circles 282.

Concentric rings, however, are not essential. FIG. 19 illustrate a portion of a target lens 292 similar to lens 276, except that the scattering and transparent areas are arranged in alternating vertical bands 294 and 296, respectively. An impingement area 298 is shown in broken lines, to indicate that once again the bands are sized to ensure that several bands 294 and several bands 296 are encompassed within the impingement area.

Regardless of the particular pattern, the favorable combination of scattering and transmissivity enables an efficient pipe section alignment procedure in which two target assemblies such as assembly 240 are inserted into the bell ends of two adjacent pipe sections. One of the target assemblies is used to align a pipe section for connection to a pipe string including a previously aligned section. The other target assembly is used on the previously aligned section, to confirm proper alignment, or warn that realignment is necessary due to jostling or other activity that has moved the bell end out of proper alignment.

Returning to FIG. 17, lens gasket 278 surrounds lens 276, having an annular channel that accommodates the outer periphery of the lens in a close fit so that gasket 278 securely grips the lens. Gasket 278 has an outside diameter approximately equal to or slightly less than an inner diameter of frame 246, so that target 248 can be inserted axially into the frame to a point where lens gasket 278 abuts shoulder 270. At its outer periphery the lens gasket has four notches 300 at 90 degree intervals. When target 248 is fully inserted into frame 246, each notch 300 accommodates one of ribs 272 in a close fit that prevents lens gasket 278 (and thus the target) from rotating relative to frame 246. Lens gasket 278 is flexible, preferably constructed of a thermoplastic rubber having a durometer (hardness) of T80. Accordingly the gasket forms an effective fluid seal between annular frame 246 and target lens 276. When compressed between the frame and lens, lens gasket 278 exerts an elastic restoring force which acts along its full circumferential extent in radially inward directions, thus tending to center lens 276 within frame 246. The lens gasket also is sufficiently flexible for convenient removal from lens 276 when the target is removed from frame 246, to facilitate cleaning the lens, replacing the gasket, etc.

While maintaining lens 276 securely within frame 246 and tending to center the lens within the frame, lens gasket 278 also protects lens 276 against damage primarily from shock and vibration, should frame 246 be dropped or otherwise experience sudden impact. The lens gasket is sufficiently flexible to absorb much of the energy from such an impact and to allow momentary displacements of lens 276 relative to frame 246 in axial and radial directions.

FIG. 20 shows the manner in which lens gasket 278 is mounted to target lens 276, i.e. by accommodating a peripheral region 302 of the lens within an annular channel 304. The lens, both as to its diameter and thickness (axial dimension), is sized for a snug fit within channel 304.

Figure 21:
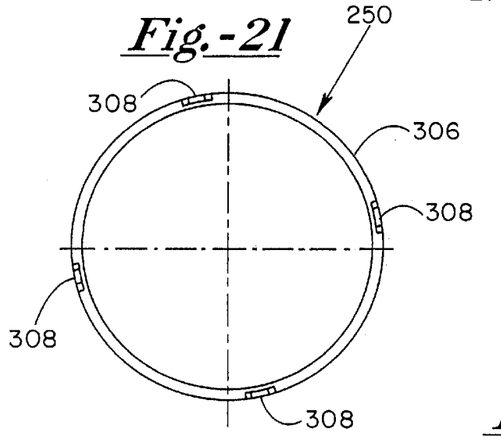
FIG. 21 is an end elevation of a clamping ring of the target assembly.

As seen in FIG. 21, clamping sleeve 250 has a flat annular outer edge 306. Outer edge 306 has a diameter substantially the same as that of lens gasket 278, facilitating the use of clamping sleeve 250 to push gasket 278 against shoulder 270 of the annular frame, and then to releasably maintain the gasket by interlocking the clamping sleeve and frame. The interlocking structure includes lugs 274 and a series of four angularly spaced apart L-shaped grooves 308, angularly spaced apart 90 degrees along the outer peripheral edge of the clamping sleeve. Each groove 308 is sized to accommodate an associated one of lugs 274, with a groove width accommodating the lug diameter and a groove depth accommodating the lug height.

Clamping sleeve 250 is used to releasably secure target 248 within frame 246. First, with the target inserted into the frame and with ribs 272 within notches 300 and lens gasket 278 adjacent shoulder 270, clamping sleeve 250 is inserted axially, angularly positioned relative to the frame so that grooves 308 encounter their associated lugs 274. Continued axial insertion eventually positions each lug at an elbow region 310 of its associated groove (FIG. 14), which prevents further axial insertion. However, the insertion to this point is sufficient to elastically compress lens gasket 278 between edge 306 and shoulder 270. With clamping sleeve 250 maintained axially, it is rotated to bring each lug to a locking position 312 within its associated groove. At this point manual pressure against clamping sleeve 250 is released, allowing the elastic restoring force of lens gasket 278 to urge sleeve 250 away from shoulder 270. This, however, drives wall portions 314 of grooves 308 against their associated lugs 274, thus securing the sleeve.

Sleeve 250 is easily removed from frame 246 if desired, by rotating the sleeve to position each lug at its associated groove elbow once again, then axially withdrawing the sleeve.

Figure 22:
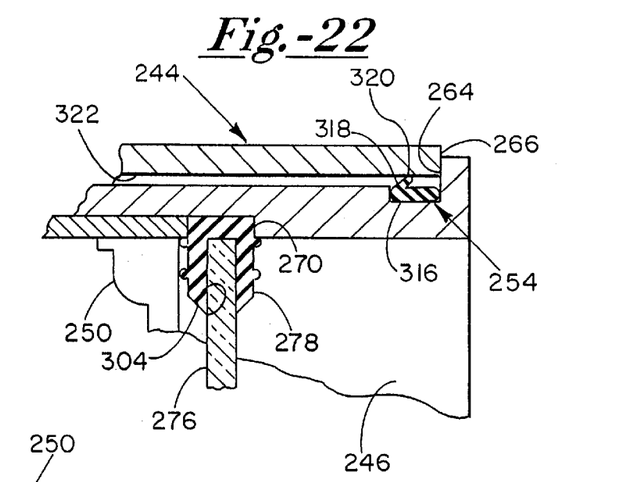
FIG. 22 is an enlarged sectional view of a portion of the frame shown in FIG. 17, including further components to illustrate mounting of the target assembly.

FIG. 22 is an enlarged sectional view of a portion of target assembly 240, illustrating the interaction of the various components when the target assembly is mounted at the bell end of pipe section 244.

While the figure illustrates a slight gap between reference surface 264 and edge 266 of the pipe section, it is to be understood that full insertion is indicated when surfaces 264 and 266 engage one another.

Outer seal gasket 254, shown seated within annular groove 268, includes a base 316 contiguous with the groove and an inclined lip 318 that projects from the base at an acute angle, to an edge 320. Outer seal gasket 254, like lens gasket 278, is constructed of a thermoplastic rubber. Outer gasket 254 is softer, with a durometer of about 40. For purposes of illustration, gasket 254 is shown in a free state, i.e. not elastically deformed by external forces. Actually, when the target assembly is inserted into pipe section 244 as shown, an inside surface 322 of the pipe section engages lip 318 near edge 320, elastically deforming the lip, and further elastically deforming the gasket by urging the lip toward base 316. Outer seal gasket 254 maintains its surface engagement with pipe section 244 and annular frame 246 along the bottom of groove 268, which acts as a reference surface. Gasket 254 exerts a radially inward restoring force substantially uniform over its circumferential extent, which tends to center frame 246 within pipe section 244. Further, the gasket establishes a fluid seal between these components. Due to the incline of lip 318 relative to the base, target assembly 240 is relatively easy to insert into the pipe section, yet is held firmly in place by the action of seal gasket 254 against the pipe section and the annular frame.

Lens gasket 278 is shown between clamping sleeve 250 and shoulder 270, with target lens 276 held within annular channel 304. Gasket 278 is under compression, exerting a restoring force that secures the target lens, tends to center the lens, protects the lens and provides a fluid seal between the annular frame and lens.

Figure 23:
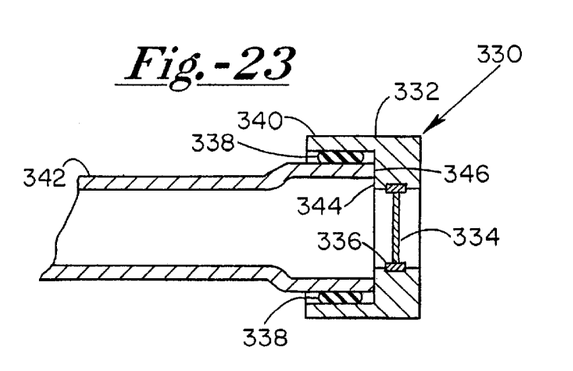
FIG. 23 is a sectional view of yet another alternative target assembly.

FIG. 23 illustrates an alternative target assembly 330 including an annular outer frame 332, a disk-shaped target 334, an annular flexible seal layer 336 for supporting the target within the frame in fluid-tight fashion, and an annular flexible seal gasket 338. Frame 332 includes an inwardly directed annular flange 340. Seal gasket 338 is mounted to flange 340, either by an adhesive as shown, or by a seating of the gasket into an annular groove formed into flange 340.

When target assembly 330 is placed onto the bell end of a pipe section 342, seal gasket 338 is compressed between a reference surface of the flange and a selected surface of the pipe section. In this case, the reference surface is the annular radially inward surface of the flange, while the selected pipe section surface, also annular, runs along the outside of the bell end. The longitudinal or axial position of the target assembly is determined by an inner edge 344 of frame 332 which abuts an annular outer edge 346 of the pipe section.

Thus in accordance with the present invention, a deformable seal member is positionable against an annular mounting or reference surface of a target and an annular inside surface portion of a pipe section, and provides forces that tend to radially center and firmly secure the target. The alignment member and another reference surface of the target can be used in combination to maintain a desired longitudinal alignment of the target. When the alignment member is fluid impermeable, it further forms a fluid seal between the target and pipe section, so that the target assembly can be used as an end cap to prevent debris and water from entering the pipe string.

What is claimed is:

1. A pipe section alignment apparatus including:

a light transmissive target;

a peripheral support structure surrounding the target and defining a first reference surface, said support structure adapted to be releasably mounted at an open end of an elongate pipe section; and a compressible alignment member surrounding the support structure and contiguous with the first reference surface, adapted to assume a compressed state between the first reference surface and a selected surface of the elongate pipe section when the peripheral support structure is so mounted, in which the alignment member exerts a radial force along substantially an entire circumferential extent thereof, thereby to determine a radial position of the target with respect to the elongate pipe section.

2. The alignment apparatus of claim 1 wherein:

said peripheral support structure further defines a planar second reference surface adapted to abut a planar edge of the elongate pipe section at the open end to determine an axial position of the target relative to the pipe section, and the alignment member when in the compressed state further tends to maintain the target in said axial position.

3. The alignment apparatus of claim 1 wherein:

the selected surface is an inside surface of the pipe section.

4. The alignment apparatus of claim 1 wherein:

said alignment member is fluid impermeable, and forms a substantially fluid tight seal between the peripheral support structure and the pipe section when the peripheral support structure is so mounted.

5. The alignment apparatus of claim 4 further including:

an elastically deformable seal member between the target and the peripheral support structure for mounting the target within the support structure.

6. The alignment apparatus of claim 4 wherein:

said alignment member is elastically compressible, and tends to radially center and maintain the target with respect to the pipe section through an elastic restoring force.

7. The alignment apparatus of claim 4 wherein:

the target is fluid impermeable, and is mounted within the peripheral support structure in substantially fluid tight fashion.

8. The alignment apparatus of claim 1 wherein:

the target is transparent and bears alignment indicia, and the target and peripheral support structure together are formed as a single unitary member.

9. The alignment apparatus of claim 1 further including:

a retaining frame releasably secured with respect to the target and having a retaining surface adapted for engaging the alignment member to retain the alignment member in said compressed state between the first reference surface and the selected surface of the pipe section.

10. The alignment apparatus of claim 9 wherein:

the first reference surface and the retaining surface are inclined at opposite angles, and cooperate to define a generally V-shaped channel for retaining the alignment member.

11. The alignment apparatus of claim 1 wherein:

the alignment member, the first reference surface and the selected surface of the pipe section are annular.

12. A pipe section aligning system including the alignment apparatus of claim 1 in combination with:

a securing means for securing a selected end of the pipe section, opposite said open end, against any substantial transverse movement; and a coherent energy source for directing a linear coherent energy beam along an interior of the pipe section toward said open end, said coherent energy beam impinging upon the target to provide a visible guide to facilitate a positional adjustment of the pipe section toward parallelism with the coherent energy beam.

13. An apparatus for aligning pipe sections, said apparatus including:

a light transmissive target;

a peripheral support structure surrounding the target and defining a first reference surface, adapted to be releasably mounted at an open end of an elongate pipe section; and a compressible and fluid impermeable seal member disposed against the first reference surface over a complete circumferential extent thereof, adapted to assume a compressed state between the first reference surface and a selected surface of the elongate pipe section near the open end, in which the seal member forms a substantially fluid tight seal between the support structure and the pipe section and determines a radial position of the target with respect to the pipe section.

14. The apparatus of claim 13 wherein:

said seal member, target mounting surface and selected surface region are annular, and the pipe section is a circular cylinder.

15. The apparatus of claim 13 wherein:

the selected surface is an inside surface of the pipe section.

16. The alignment apparatus of claim 13 wherein:

said alignment member is elastically compressible and tends to radially center and maintain the target with respect to the pipe section through an elastic restoring force.

17. The apparatus of claim 13 wherein:

the target is fluid impermeable and bears alignment indicia.

18. The apparatus of claim 17 wherein:

the target is transparent, and the target and peripheral support structure together are formed as a single unitary member.

19. The alignment apparatus of claim 13 further including:

an elastically deformable seal member between the target and the peripheral support structure for mounting the target within the support structure.

20. The alignment apparatus of claim 13 wherein:

the seal member, the first reference surface and the selected surface of the pipe section are annular.

21. A pipe section aligning system including the apparatus of claim 13 in combination with:

a securing means for securing a selected end of the pipe section, opposite said open end, against any substantial transverse movement; and a coherent energy source for directing a linear coherent energy beam along an interior of the pipe section toward said open end, said coherent energy beam impinging upon the target to provide a visible guide to facilitate a positional adjustment of the pipe section toward parallelism with the coherent energy beam.

22. A piping alignment target, including:

a light transmissive target body having a target surface; and a target mounting structure adapted to releasably mount the target body at an open end of an elongate pipe section, such that a linear coherent energy beam, directed along an interior of the pipe section with its beam axis at least substantially parallel to a longitudinal axis of the pipe section, intersects the target surface at an impingement area;

wherein the target surface, over at least a selected surface region thereof, causes substantial off-axis scattering of the coherent energy, to facilitate a visual recognition of the impingement area from locations transversely spaced apart from the beam axis.

23. The target of claim 22 wherein:

said selected surface region is adapted to transmit at least about 30 percent of the coherent energy beam in the direction of the beam axis.

24. The target of claim 22 wherein:

said selected surface region is formed by texturing the target surface throughout the selected region, to impart a selected surface roughness.

25. The target of claim 22 wherein:

said selected surface region is composed of a plurality of scattering areas separated from one another by substantially transparent areas.

26. The target of claim 25 wherein:

said light scattering areas are annular, and concentric about a center of the target body.

27. The target of claim 25 wherein:

the dimensions of the light scattering areas, and the spacing of adjacent light scattering areas from one another, are selected to ensure that said impingement area encompasses at least two of the light scattering areas.

28. The target of claim 22 wherein:

the target mounting structure includes a peripheral support structure surrounding the target and defining a first reference surface, and a compressible alignment member surrounding the support structure and contiguous with the first reference surface, adapted to assume a compressed state between the first reference surface and a selected surface of the elongate pipe section, in which the alignment member exerts a radial force along substantially an entire circumferential length thereof, thereby to determine a radial position of the target with respect to the pipe section.

29. The target of claim 28 wherein:

the alignment member is fluid impermeable, and is adapted to form a substantially fluid tight seal between the peripheral support structure and the pipe section.

30. A pipe section alignment system including the target of claim 22 in combination with:

a securing means for securing a selected end of the elongate pipe section, opposite said open end, against any substantial transverse movement; and coherent energy source, integral with the securing means, for directing said coherent energy beam along the interior of the pipe section to intersect the target surface at the impingement area.

* * * * *